United States Patent
Berdelle-Hilge

(10) Patent No.: US 9,481,529 B2
(45) Date of Patent: Nov. 1, 2016

(54) TILT-TRAY CONVEYING CARRIAGE AND TILT-TRAY SORTING INSTALLATION

(71) Applicant: SIEMENS AKTIENGESELLSCHAFT, Munich (DE)

(72) Inventor: Peter Berdelle-Hilge, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/902,885

(22) PCT Filed: Jun. 23, 2014

(86) PCT No.: PCT/EP2014/063122
§ 371 (c)(1),
(2) Date: Jan. 5, 2016

(87) PCT Pub. No.: WO2015/000729
PCT Pub. Date: Jan. 8, 2015

(65) Prior Publication Data
US 2016/0137429 A1 May 19, 2016

(30) Foreign Application Priority Data
Jul. 5, 2013 (DE) .......................... 10 2013 213 229

(51) Int. Cl.
*B65G 7/08* (2006.01)
*B65G 47/96* (2006.01)

(52) U.S. Cl.
CPC .................... *B65G 47/962* (2013.01)

(58) Field of Classification Search
CPC ............................. B65G 7/08; B65G 47/962

USPC ..................................................... 198/370.04
See application file for complete search history.

(56) References Cited

U.S. PATENT DOCUMENTS

| 3,209,893 A | 10/1965 | Trautwein |
| 6,712,194 B1 | 3/2004 | Abildgaard et al. |
| 6,874,614 B2 | 4/2005 | Heitplatz |
| 8,727,103 B2 * | 5/2014 | Vitalini ............... B65G 47/962 198/370.03 |
| 2006/0260908 A1 | 11/2006 | Affaticati |

(Continued)

FOREIGN PATENT DOCUMENTS

| DE | 1069530 B | 11/1959 |
| DE | 3511936 A1 | 10/1986 |

(Continued)

*Primary Examiner* — Gene Crawford
*Assistant Examiner* — Lester Rushin
(74) *Attorney, Agent, or Firm* — Laurence Greenberg; Werner Stemer; Ralph Locher

(57) ABSTRACT

A tilt-tray sorting installation for articles and a tilt-tray conveying carriage for use in a tilt-tray sorting installation. The tilt-tray conveying carriage has a basic carriage, which is configured for displacement in the tilt-tray sorting installation, a carrying tray, which can be pivoted about a tilting axis relative to the basic carriage, and a tilting drive. A drive device of the tilting drive is fixed in relation to the basic carriage. A traction device is operatively connected to the drive device and the carrying tray. In order to render the devices suitable for heavy articles, the tilt-tray conveying carriage is provided with a traction-device guide which is arranged in a rotatably fixed manner on the carrying tray, against which the traction device abuts, at least in part, and which deflects the traction device.

5 Claims, 2 Drawing Sheets

(56) References Cited

U.S. PATENT DOCUMENTS

2011/0114447 A1 5/2011 Vitalini
2013/0126304 A1 5/2013 Stikkelorum

FOREIGN PATENT DOCUMENTS

| DE | 4042709 C2 | 6/2000 |
| WO | 2010012755 A1 | 2/2010 |

* cited by examiner

TILT-TRAY CONVEYING CARRIAGE AND TILT-TRAY SORTING INSTALLATION

BACKGROUND OF THE INVENTION

Field of the Invention

The invention relates to a tilt tray conveying carriage for use in a tilt tray sorting installation, comprising a basic carriage, which is designed for displacement in the tilt tray sorting installation, a carrying tray, which can be pivoted about a tilting axis relative to the basic carriage, and a tilting drive, which has a drive means, which is fixed in relation to the basic carriage, and a traction means, which is operatively connected to the drive means and the carrying tray.

The invention also relates to a tilt tray sorting installation for articles, comprising a rail, a plurality of tilt tray conveying carriages which are each designed for displacement along the rail, and comprising a tilt tray conveying carriage drive by which one or more tilt tray conveying carriage(s) can be moved along the rail.

Tilt tray sorting installations, also called tilt tray sorters, have for a long time proven themselves for transporting and separating articles. The articles to be conveyed, for example packets or items of luggage, are received by the track-guided carriages which on their top side have load carriers designed as carrying trays which are held horizontally for transportation of the articles and can be tilted to drop the articles on either side of the track system.

For example, a tilt tray sorting conveyer of the type described in the introduction is known from WO 2010/012755 A1. Sprung deflection or tension rollers are used to compensate differences in the length of the traction means during tilting of the carrying tray. However, drawbacks can occur in particular in the case of heavy articles, which are conveyed on the carrying tray, due to the resilient elements in the tilting drive.

Other tilt tray conveyors are known for example from DE 35 11 936 A1, U.S. Pat. No. 6,712,194 B1 or U.S. Pat. No. 6,874,614 B2.

BRIEF SUMMARY OF THE INVENTION

It is therefore the object of the invention to improve the tilt tray conveying carriage mentioned above such that it is better suited to conveying heavy articles.

The tilt tray conveying carriage of the type mentioned above achieves this object according to the invention by a traction means guide which is arranged in a rotatably fixed manner on the carrying tray, against which guide the traction means butts, at least in part, and which deflects the traction means away from the tilting axis.

For the tilt tray sorting installation the object is achieved by the use of the inventive tilt tray conveying carriage.

The inventive solution has the advantage that a kinematically induced difference in the length of the traction means between the different positions of the carrying tray can be adjusted by the traction means guide. Resilient elements in the tilting drive for example can consequently be omitted. The traction means guide can be for example bulging, curved outwards or be convex.

Within the meaning of the invention a "carrying tray" is also taken to mean a borderless platform, as is disclosed for example in the documents from the prior art cited above. The term "tilt tray conveying carriage" is therefore to be interpreted as a conveying carriage, the term "tilt tray sorting installation" is to be interpreted as a sorting installation and the term "carrying tray" is to be interpreted as a carrying device. Furthermore, the term "rotatably fixed" in the case of the connection between the carrying tray and the traction means guide should not just be taken to mean that these are rigidly connected together. Instead the term "rotatably fixed" should also be taken to mean that a rotation of the traction means guide at least indirectly triggers a rotation of the carrying tray as well. For example, a driver between the carrying tray and the traction means guide can have a certain clearance or damping or suspension which a rotatably fixed connection also embraces within the meaning of the invention. Furthermore, the term "deflects" or "deflected" should not be taken to mean a change in position triggered by a movement, or an enlargement of the spacing from the axis of rotation, but rather outwardly curved guiding of the traction means away from the tilting axis by the traction means guide.

The invention can be developed further by various mutually independent advantageous embodiments.

The traction means guide can therefore run along a section of an arc around the tilting axis in the transverse direction to the tilting axis. This has the advantage that no kinematically induced difference in the length of the traction means results between the different positions of the carrying tray. This provides a correspondingly rigid drive train of the tilting drive.

To reduce the required installation space and the mass moment of inertia of the carrying tray, the traction means guide can have two guide sections between which the traction means guide is recessed along the arc in each case. Recesses are constructed for this purpose.

An inexpensive embodiment may be achieved in that the traction means is frictionally connected to the traction means guide and surrounds the traction means guide. A screw fastening or the like of the traction means to the traction means guide is consequently superfluous.

The tilting axis of the tilt tray conveying carriage is designed to be fixed. Alternatively, the tilting axis can also be designed to move as a moment pole axis.

BRIEF DESCRIPTION OF THE SEVERAL VIEWS OF THE DRAWING

The invention will be illustrated below with reference to the accompanying drawings, in which.

DESCRIPTION OF THE INVENTION

Figure 1:
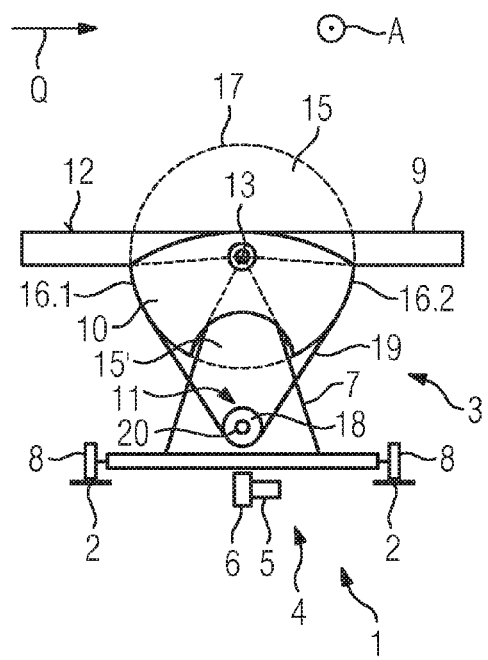
FIG. 1 shows a schematic diagram of a tilt tray sorting installation in a side view.

First of all the invention will be illustrated with reference to the exemplary embodiment of FIGS. 1 to 4.

The inventive tilt tray sorting installation 1 has a rail 2, a plurality of tilt tray conveying carriages 3 and a tilt tray conveying carriage drive 4.

In the exemplary embodiment of the figures the track system 2 is designed as a double rail on which the tilt tray conveying carriages 3 move. Alternatively, the track system 2 can also be designed as a monorail or the like. The track system 2 can have an energy transmission device (not shown) which transmits electrical energy to the tilt tray conveying carriage 3. As is known, the track system 2 runs for example as an endless track system with input and output mechanisms on which articles (not shown) are transferred in a known manner to the tilt tray conveying carriages and dispensed from them by their tiling movement. The track system is arranged so as to be substantially fixed.

The tilt tray conveying carriage drive 4 is also arranged so as to be fixed in FIG. 1 and designed to drive the tilt tray conveying carriages 3 on the track system 2. The tilt tray conveying carriage drive 4 is illustrated very simply as an electric motor 5 having a friction wheel 6 in the exemplary embodiment in FIG. 1. The electric motor 5 converts electrical energy into a rotational movement which is transmitted for example by a gear (not shown) to the friction wheel 6. The friction wheel 6 drives the tilt tray conveying carriages 3. Of course other tilt tray conveying carriage drives 4 are possible, as are known in the prior art, such as a chain drive or the like. The tilt tray conveying carriage drive 4 can also alternatively be part of each tilt tray conveying carriage 3 and drive this autonomously.

The tilt tray conveying carriage 3 comprises a basic carriage 7, wheels 8, a carrying tray 9, traction means guide 10 and a tilting drive 11.

The basic carriage 7 has the four wheels 8 with which the tilt tray conveying carriage 3 rests on the track system 2.

Figure 2:
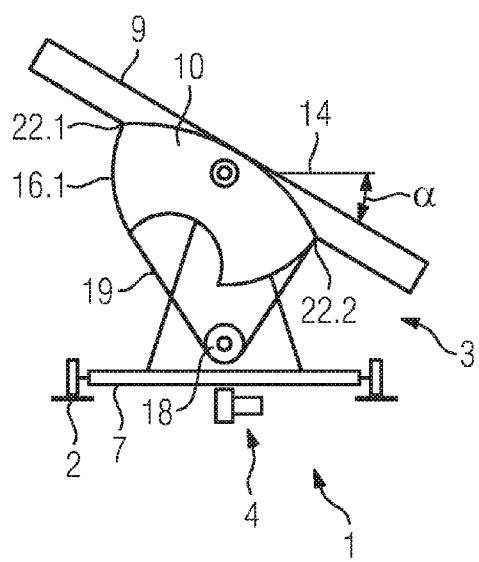
FIG. 2 shows the tilt tray sorting installation from FIG. 1 in a first tilted position.
Figure 3:
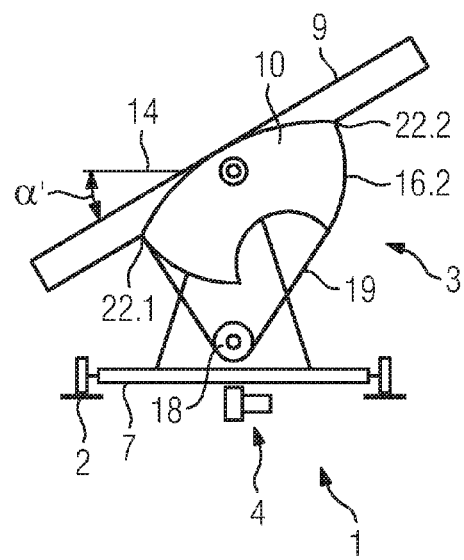
FIG. 3 shows the tilt tray sorting installation from FIG. 1 in a second tilted position.
Figure 4:
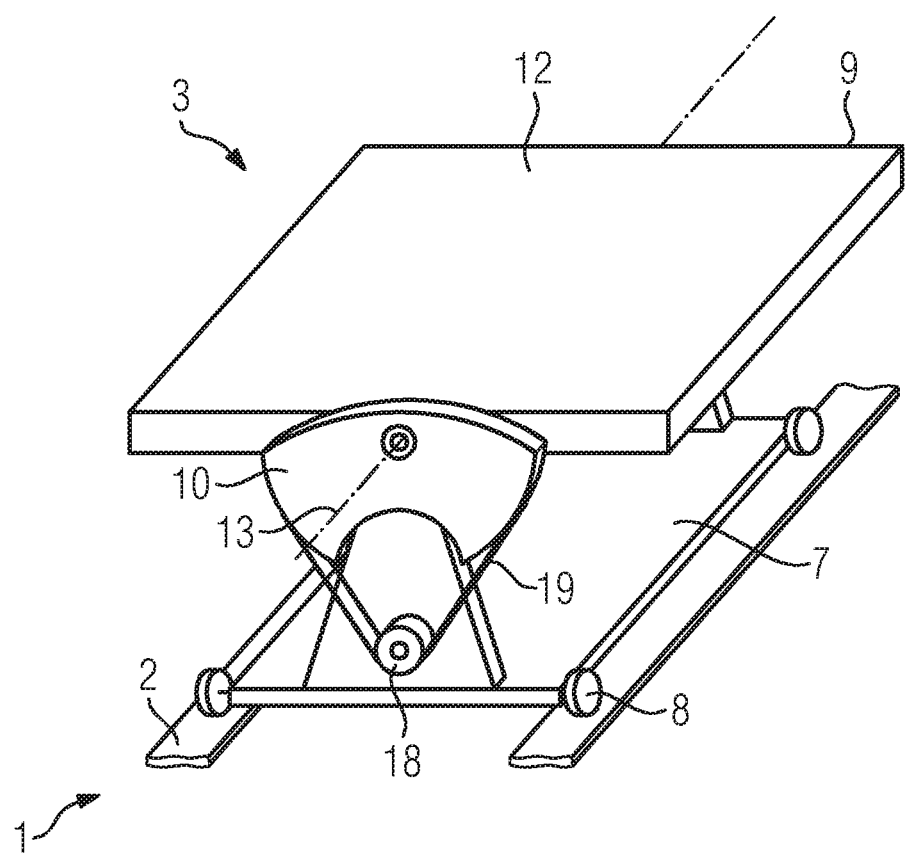
FIG. 4 shows a schematic 3D diagram of the embodiment from FIG. 1.

The carrying tray 9 has a substantially rectangular carrying surface 12 on which the articles can be arranged during transportation. The carrying tray 9 is connected to the basic carriage 7 so as to be rotatable about a tilting axis 13 which runs into the drawing plane. In the embodiment in FIG. 1 the tilting axis 13 is arranged in the transverse direction Q centrally between the illustrated wheels 8 and centrally from the basic carriage 7. FIG. 1 shows the carrying tray 9 in a transportation position in which the carrying surface 12 of the carrying tray 9 is oriented substantially horizontally, parallel to the track system 2. FIG. 2 shows the tilt tray conveying carriage 3 in a first tilting position in which the carrying tray 9 and its carrying surface 12 is inclined about an angle of inclination α of 30° to the horizontal 14. FIG. 3 shows the tilt tray conveying carriage 3 in a second tilting position in which the carrying tray 9 with the carrying surface 12 is inclined by an angle of inclination α of −30° to the horizontal 14. In the exemplary embodiments in FIGS. 1-5 the tilting axis 13 is designed so as to be fixed.

The traction means guide 10 is connected in a rotatably fixed manner to the carrying tray 9. Like the carrying tray 9 the traction means guide 10 is also arranged so as to be rotatable about the tilting axis 13 with respect to the basic carriage 7. The traction means guide 10 is designed as a disk, i.e. as a very thin circular cylinder, with the axis of rotation 13 as the center point in which parts 15, 15' are recessed. The traction means guide 10 is consequently designed as a sector of a disk. The traction means guide 10 has two guide sections 16 which each run roughly about 60° on the arc around the tilting axis 13. Between the guide sections 16 the arc 17 is recessed on one side by about 180° by the recess 15 and on the other side by about 60° by the recess 15'.

The tilting drive 11 comprises drive means 18 and traction means 19 which surround the drive means 18 and the traction means guide 10. In the embodiment in FIG. 1 the drive means 18 is designed as an electric motor with a gear and a drive roller. The drive means 18 is arranged on the basic carriage 7, it being possible for the drive roller to rotate about a drive axis 20 relative to the basic carriage 7. In the embodiment in FIG. 1 the traction means 19 is designed as a flat belt. The traction means 19 frictionally surrounds the traction means guide 10 at its circumference.

With the aid of the tilting drive 11 the tilt tray conveying carriage 3 can be moved back and forth between the transportation position in FIG. 1, the first tilting position in FIG. 2 and the second tilting position in FIG. 3. For this purpose the drive means 18 drives the traction means 19 so the traction means guide 10 and the carrying tray 9 are driven and pivoted. In the first tilting position in FIG. 2 the traction means 19 on the left-hand guide section 16.1 butts against the traction means guide 10. The traction means 19 is deflected away from the tilting axis 13 with respect to a straight connection between the drive means 18 and a first point of contact 22.1. On the other hand, in the position in FIG. 2 the traction means 19 is not deflected on the opposing guide section 16.2 but runs in a straight line between drive means 18 and a second point of contact 22.2.

In the second tilting position in FIG. 3, on the other hand, the traction means 19 butts against the right-hand guide section 16.2 and is accordingly deflected in the other direction by the traction means guide.

To avoid an interfering contour with the articles to be transported and to reduce the mass of the traction means guide 10 and its moment of inertia, the part 15 is recessed at the top. To further reduce the mass of the traction means guide 10, the part 15' is also recessed at the bottom between the guide sections 16.

The invention claimed is:

1. A tilt tray conveying carriage for use in a tilt tray sorting installation, the tilt tray conveying carriage comprising:
   a basic carriage configured for displacement in the tilt tray sorting installation;
   a carrying tray pivotally mounted about a tilting axis relative to said basic carriage; and
   a tilting drive including:
   a drive device disposed on said basic carriage;
   a traction device operatively connected to said drive device and to said carrying tray; and
   a traction device guide mounted rotatably fixed on said carrying tray, wherein said traction device abuts against said traction device guide, at least in part, and said traction device guide runs along an arc around said tilting axis in a transverse direction relative to said tilting axis and is configured to deflect said traction device away from said tilting axis.

2. The tilt tray conveying carriage according to claim 1, wherein said traction device guide has two guide sections and is recessed in between said guide sections.

3. The tilt tray conveying carriage according to claim 2, wherein said traction device guide is formed with two recessed segments, one on each side of said two guide sections.

4. The tilt tray conveying carriage according to claim 1, wherein said traction device is frictionally connected to said traction device guide and disposed to surround said traction device guide.

5. A tilt tray sorting installation for articles, the sorting installation comprising:
   a track system;
   a plurality of tilt tray conveying carriages, each according to claim 1, and each configured for displacement along a track of said track system; and
   a tilt tray conveying carriage drive configured to move one or more of said tilt tray conveying carriages along said rail.

* * * * *